United States Patent [19]

Rubin et al.

[11] 4,136,711

[45] Jan. 30, 1979

[54] PILOT OPERATED BALL COCK VALVE

[75] Inventors: Sol R. Rubin, Beverly Hills; Raymond D. Gates, Huntington Beach, both of Calif.

[73] Assignee: Masco Corporation, Taylor, Mich.

[21] Appl. No.: 799,502

[22] Filed: May 23, 1977

[51] Int. Cl.² ............................................. F16K 31/34
[52] U.S. Cl. ..................................... 137/414; 137/436; 137/447; 251/118; 251/46
[58] Field of Search ............... 137/215, 414, 436, 441, 137/442, 444, 447, 451; 251/45, 46, 118, 120, 121

[56] References Cited

U.S. PATENT DOCUMENTS

| | | | |
|---|---|---|---|
| 943,755 | 12/1909 | Morrison | 137/444 |
| 1,158,869 | 11/1915 | Thomson | 251/46 |
| 1,621,910 | 3/1927 | Thomson et al. | 137/414 |
| 2,854,994 | 10/1958 | Glasgow | 137/144 |
| 3,401,716 | 9/1968 | Gallogly | 137/414 |
| 3,693,649 | 9/1972 | Gordon et al. | 137/414 |
| 3,853,141 | 12/1974 | Fischer | 137/451 |
| 3,930,516 | 1/1976 | Flinner et al. | 137/436 |

*Primary Examiner*—Martin P. Schwadron
*Assistant Examiner*—G. L. Walton
*Attorney, Agent, or Firm*—Albert M. Herzig; Edward C. Walsh

[57] ABSTRACT

A pilot operated ball cock valve for controling the height of fluid in a tank. The rotary pilot valve has an inlet port and an outlet port which are interconnected and communicate with a fluid channel which bypasses an evacuation chamber and a diaphragm valve permitting fluid to flow directly to the inlet port of the rotary pilot valve. The outlet port of the rotary valve is positioned by a predetermined fluid height in the tank into alignment with a fluid channel which transmits fluid pressure into a pressure chamber above the diaphragm. Such positioning allows fluid pressure to act upon the diaphragm which closes a discharge orifice thereby preventing flow of fluid into the tank. A decrease in fluid height in the tank induces the rotary pilot valve to rotate such that the outlet port will move out of alignment with the fluid channel leading into the pressure chamber. A lip seal containing the outlet port of the valve is then forced by fluid pressure against the well surface with which the rotary pilot valve articulates preventing the leakage of fluid through its outlet port. A fluid channel communicating with the evacuation chamber and the periphery of the rotary pilot valve allows the pressure in the pressure chamber to be relieved and the diaphragm opens permitting fluid to be evacuated into the tank until the fluid level reaches the predetermined height where the outlet port of the rotary pilot valve is realigned for transmission of fluid pressure into the chamber.

10 Claims, 8 Drawing Figures

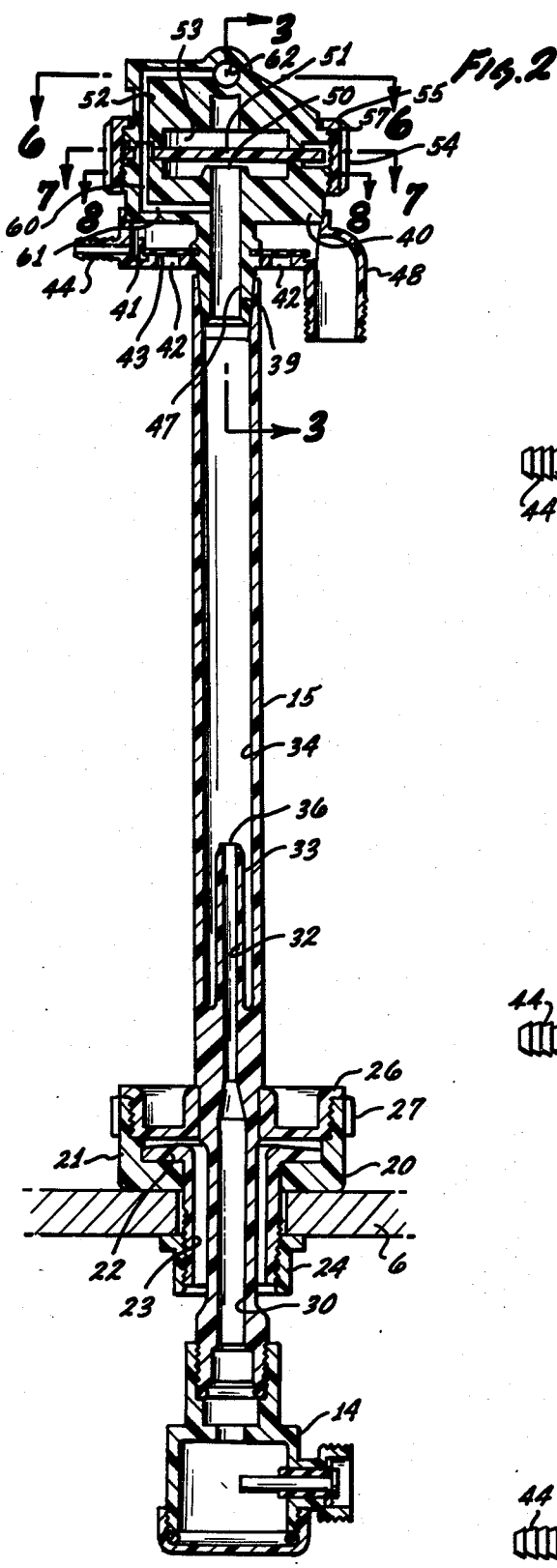
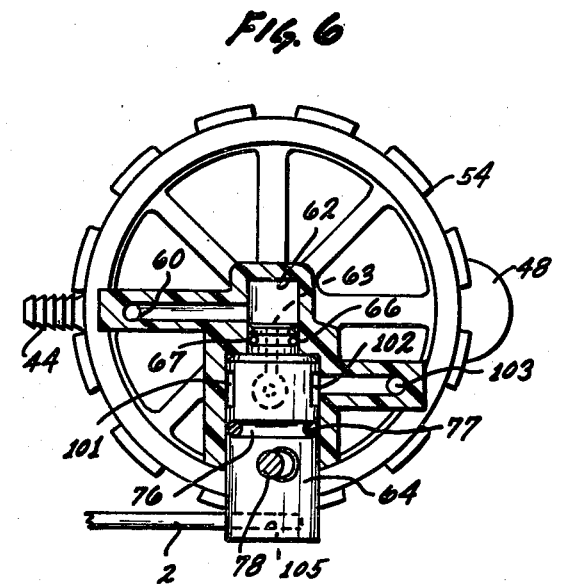
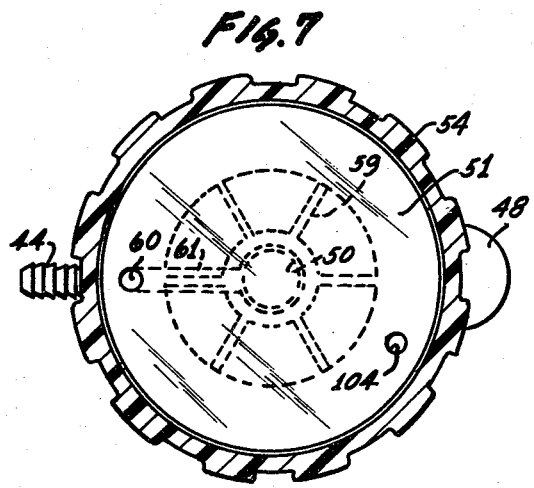
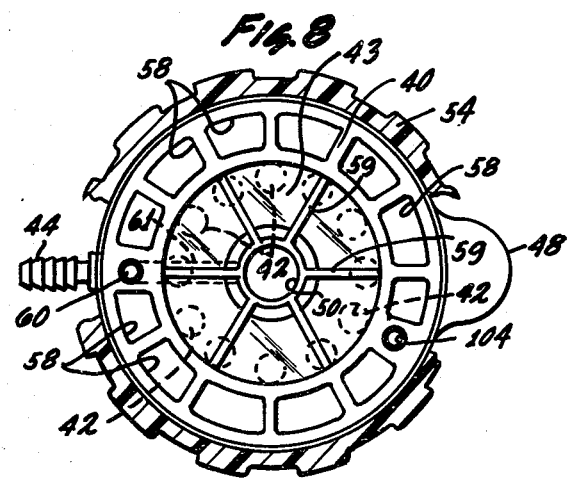

PILOT OPERATED BALL COCK VALVE

BACKGROUND OF THE INVENTION

1. Field of the Invention

This invention relates to a ball cock rotary type valve for controlling the height of fluid in a tank.

2. Description of the Prior Art

The combination of a diaphragm type ball cock valve which is controlled by a float has precedence in the prior art. U.S. Pat. Nos. 1,521,745 and 2,681,661 disclose the combination of a diaphragm type ball cock valve controlled by a float operated pilot valve and U.S. Pat. No. 2,854,994 discloses a float-operated rotary pilot valve controlling a diaphragm valve. A limitation of diaphragm type ball cock valves in the prior art was that the fluid passage through the diaphragm valve itself precluded effective sealing of the valve resulting in eventual wear and erratic operation. The present invention contains no fluid channels passing through the pressure surface of the diaphragm valve thereby eliminating leakage of fluid between the opposing chambers separated by the diaphragm promoting more efficient operation and longer life of the valve itself. Pilot operated rotary valves containing passageways for the flow of fluid within the valve require effective sealing in order for fluid pressure to alternately increase and decrease in the chambers in communication with the diaphragm valve. This invention utilizes a lip seal plug in the outlet port of the rotary valve which is sealed against the valve housing wall by the fluid pressure itself when the outlet port rotates out of communication with a fluid channel and promotes more efficient operation of the diaphragm valve by substantially eliminating fluid leakage.

SUMMARY OF THE INVENTION

In accordance with this invention, a pilot operated ball cock valve controls the level of fluid in a tank through the combination of a diaphragm valve and a rotary pilot valve. The rotary pilot valve contains an inlet port where fluid under pressure which has bypassed the diaphragm valve enters the rotary valve and may thereafter discharge through an outlet port contained in the rotary valve through a fluid channel communicating with a pressure chamber above the diaphragm. A lip seal contained in the outlet port is positioned such that when the outlet port is out of communication with the channel leading into the pressure chamber, fluid pressure will force the lip seal against the wall of the valve housing. This seals off the fluid channel within the rotary valve and precludes transmission of pressure through the outlet port of the rotary valve. At a predetermined height of fluid in a tank, the rotary valve is positioned such that fluid pressure is transmitted through the aligned outlet port of said valve with a channel leading into a pressure chamber adjacent and spaced to the diaphragm valve. The fluid pressure acting upon the diaphragm closes the diaphragm and prevents fluid from entering into the tank. A decrease in height of fluid will cause rotation of the rotary valve and the outlet port of said valve will move out of communication with the fluid channel leading into the pressure chamber. The pressure will be relieved in the pressure chamber by fluid leading from said chamber in the valve periphery and the diaphragm valve opens allowing fluid to flow into the tank and as the fluid level rises the rotary valve again rotates until the predetermined fluid level is reached whereby fluid pressure is again transmitted into the pressure chamber which closes the diaphragm precluding further discharge of fluid into the tank. It is an object of the present invention to provide an improved pilot operated ball cock valve with fluid passageways therein which substantially eliminates fluid leakage and pressure loss.

It is a further object of this invention to provide a diaphragm valve which contains no orifice in its pressure surface between the opposing chambers separated by the diaphragm.

It is a further object of this invention to provide a rotary pilot valve with an internal passageway connecting an inlet and outlet port where a lip seal contains the outlet port such that when the output port is out of communication with a fluid passage leading to the pressure chamber the lip seal is forced by fluid pressure within the rotary valve against the valve housing precluding the transmission of fluid pressure through the rotary valve.

Further objects and additional advantages of the invention will become apparent from the following detailed description and annexed drawings.

BRIEF DESCRIPTION OF THE DRAWINGS

FIG. 2 is a cross-section of the valve assembly.

FIG. 6 is a sectional view taken along the line 6—6 of FIG. 2.

FIG. 7 is a sectional view taken along line 7—7 of FIG. 2.

FIG. 8 is a sectional view taken along the line 8—8 of FIG. 2.

DETAILED DESCRIPTION OF THE INVENTION

Figure 1:
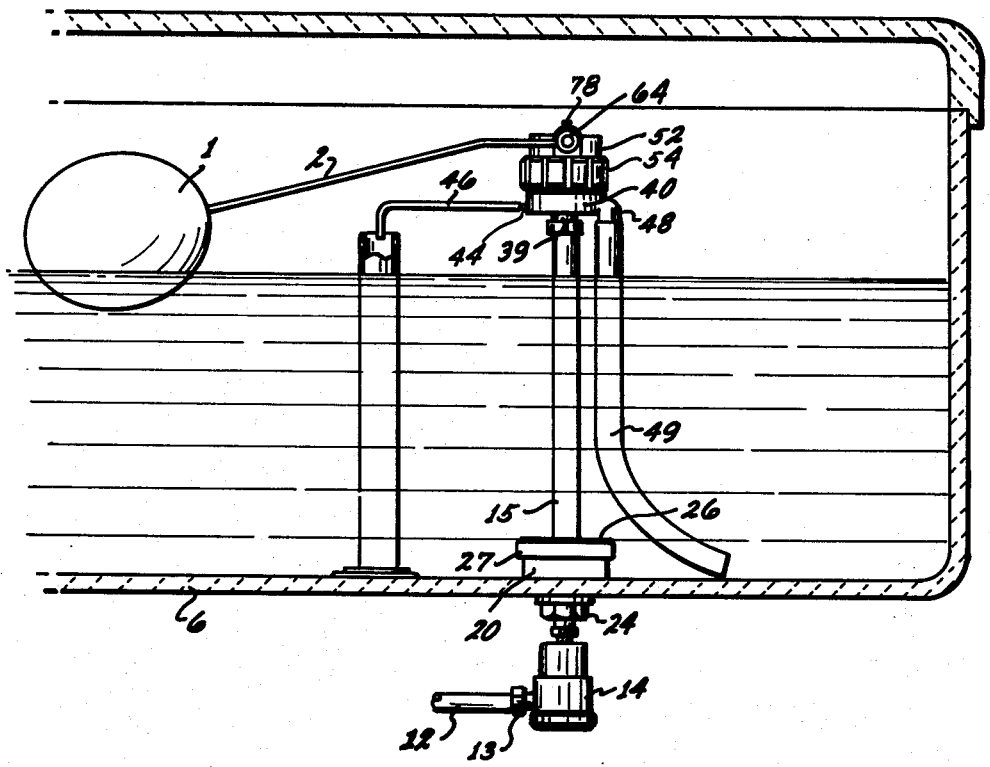
FIG. 1 is a cross-section of a tank showing a general configuration of the valve assembly.

Referring to the drawings, an inlet fluid supply tube 12 as shown in FIG. 1 is connected by a fastener 13 to a sound reducing member 14 which is coupled to the inflow pipe 15 at a point spaced exterior to the fluid tank 6.

As more particularly shown in FIG. 2, inflow pipe 15 is acoustically mounted to the tank 6 by an acoustic bushing 20 made of an elastomeric material such as rubber, or the like, the bottom surface of which rests against the internal wall of tank 6. Acoustic bushing 20 has an annular lip 21 which interfits with the annular flange of a mounting spud 22, said spud having a longitudinal bore therein 23 through which the inflow pipe 15 passes. Mounting spud 22 passes through the tank wall and engages a mounting nut 24 exterior to the tank wall and upon tightening of mounting nut 24 the acoustic bushing 20 firmly seats against the interior of the tank wall. An upper acoustic riser mounting ring 26 snugly fits around the peripheral surface of the inflow pipe 15; the outer circumference of the acoustic riser has gripping serrations which engage acoustic bushing 20. Acoustic riser ring 26 and acoustic bushing 20 are pressed together by a compression ring 27 along the upper periphery of acoustic bushing 20.

As shown in FIG. 2, inflow pipe 15 has a bore at its inlet end 30 which tapers into a bore 32 of smaller diameter forming an internal nozzle 33 within the central bore 34 of inflow pipe 15. Nozzle 33 forms an orifice 36 which discharges fluid into the central bore 34 into which nozzle 33 protrudes where said nozzle is spaced so as to provide a void between the external surface of the nozzle 33 and the internal wall of inflow pipe 15.

At the discharge end of inflow pipe 15, the internal bore tapers to a larger diameter for engagement with boss 39 extending from lower housing 40. Within lower housing 40 there is an evacuation chamber 41 through the bottom of which there are a plurality of equally spaced anti-siphon air holes 42. A flexible ring seal 43 is firmly attached around the periphery of the boss 39 of the lower housing where the bottom surface of flexible ring seal 43 covers the plurality of anti-siphon air holes 42. In operation, the flexible ring 43 will allow atmospheric pressure to vent into evacuation chamber 41 should atmospheric pressure be greater than the pressure in the evacuation chamber. Flexible ring 43 unseals when atmospheric pressure exiting through the anti-siphon air holes 42 flexes member 43 so as to allow air to pass into the evacuation chamber.

Located at the periphery of the evacuation chamber is an overflow nozzle 44 with a threaded end for connection with an overflow tube 46 where said overflow tube is shown in FIG. 1. Also located at the periphery of the evacuation chamber, as shown in FIG. 2, is an evacuation nozzle or nipple orifice 48 protruding from the lower housing 40 and integrally associated with evacuation chamber 41. The outer periphery of the evacuation orifice engages a flexible refill tube 49 through which fluid evacuates into the fluid tank. See FIG. 1.

At the top of lower housing inlet 46, there is a discharge orifice 50 at the end of bore 46 through which fluid passing through lower bore 46 is subsequently discharged into evacuation chamber 41. Spaced above said discharge orifice 50 is a diaphragm valve 51 made of a flexible material which is securely held between the upper housing 52 and the lower housing 40. The upper face of the diaphragm valve 51 is exposed to pressure chamber 53 which is contained within upper housing 52. A threaded valve collar 54 screws onto the threaded portion of lower housing 40 where valve collar 54 contains an internal peripheral flange surface 55 which presses against an annular lip 57 on the periphery of upper housing 52 such that when the collar 54 is tightened, upper housing 52 is securely fastened to lower housing 40.

FIG. 8 shows the internal construction of lower housing part 40. Its wall construction has angularly spaced recesses 58. Numeral 59 designates one of a plurality of angularly spaced radial webs between which water can pass down to diaphragm 43.

A bypass channel 60 is formed within both lower housing 40 and upper housing 52. Inlet 61 to the bypass channel is situated in the lower housing inlet bore 46 and bypass channel 60 terminates at charging port 62 located in upper housing 52. See FIG. 2. Charging port 62 is a cylindrical void into which the bypassing fluid discharges before entering inlet passage or bore 63 of pilot valve 64 which is more particularly shown in FIG. 3 of the drawings.

Figure 3:
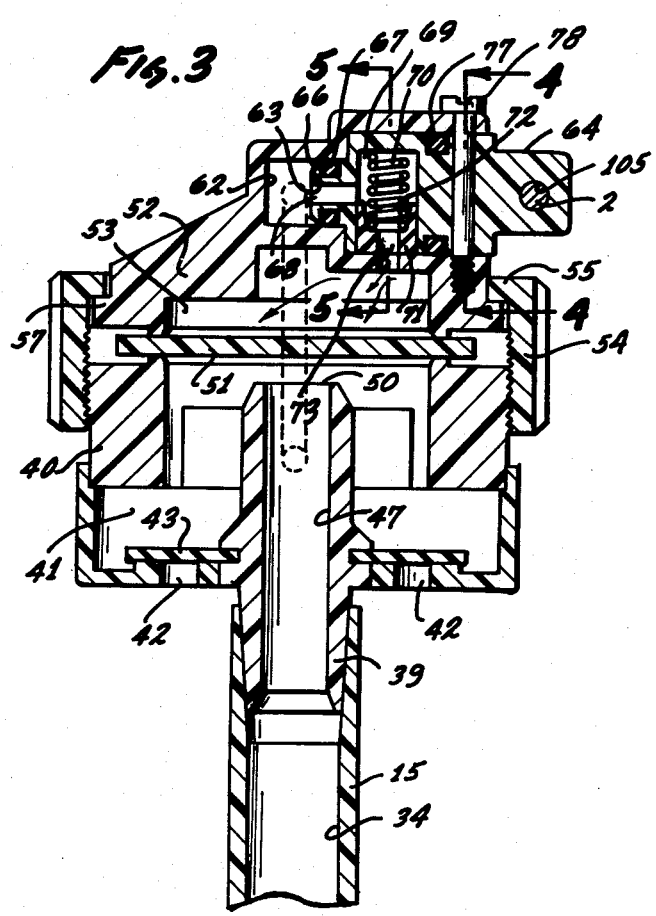
FIG. 3 is a sectional view taken along the line 3—3 of FIG. 2.

Referring to FIG. 3, pilot valve 64 has an annular groove 66 which contains an O-ring 67 therein to prevent the escape of fluid from charging port 62 into the peripheral space between the pilot valve 64 and the wall of upper housing 52. Fluid entering charging port 60 passes through valve inlet port 68 into inlet passage 63 where said fluid continues to pass without obstruction into a cylindrical right angle bore 69 within pilot valve 64. A resilient means such as spring 70 is inserted into cylindrical bore 69 and impinges upon a lipseal puck 71 which seals against the periphery of circular bore 69 at its open end. Lipseal puck 71 has a tapered countersunk bore at its upper surface which receives spring 70, where spring 70 acts so as to urge the lipseal puck 71 against the upper valve housing wall. The outer periphery of lipseal puck 71 contacts the wall of cylindrical bore 69 in flush relationship. The tapered inside periphery 72 of the countersunk bore is lipseal puck 71 permits fluid pressure acting along the surface of the taper 72 to seal lipseal puck 71 flushly against the wall of cylindrical bore 69. A channel or bore 73 extends through the interior of lipseal puck 71 to an outlet port 74 at the articulating surface of lipseal 71 with the upper valve housing wall. Pressure chamber 53 contains a connecting fluid channel 75 connecting pressure chamber 53 to cylindrical bore 69 such that communication between the pressure chamber and cylindrical bore 69 occurs when outlet port 74 is aligned with fluid channel 75. An annular groove 76 located in the pilot valve 64 contains an O-ring 77 preventing leakage between the outer periphery of pilot valve 64 and the upper housing wall when connecting channel 75 and valve outlet port 74 are out of communication. See FIG. 3.

Figure 4:
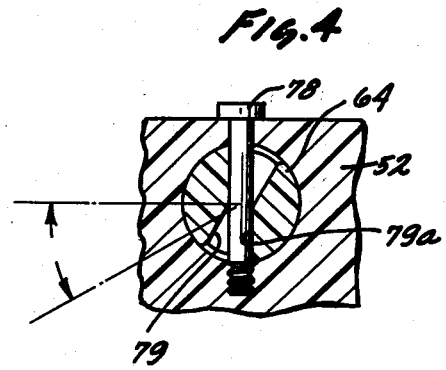
FIG. 4 is a sectional view taken along the line 4—4 of FIG. 3, and depicts the range of rotary movement of the pilot valve.
Figure 5:
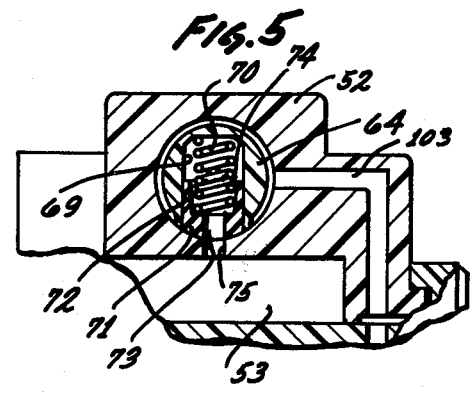
FIG. 5 is a sectional view along the line 5—5 of FIG. 3.

Pilot valve 64 is rotatably mounted in the upper housing 52 and is retained within said upper housing with stud or screw 78 which passes through the pilot valve 64 and fastens at its threaded end in lower housing 40. Rotation of pilot valve 64 is limited through an angle defined by intersecting radial bores 78 and 79 through the pilot valve, as shown in FIG. 4, creating opposing slots on the periphery of the valve through which stud 70 passes.

Spaced between the annular grooves 76 and 66 on the outer surface of the valve 64 are symmetrical grooves 101 and 102 diametrically opposed on the surface of valve 64. See FIG. 6. Groove 101 communicates with a fluid channel 103 which passes through the upper housing 52, bypasses the diaphragm 51 and communicates with the evacuation chamber 41 at evacuating chamber channel port 104 as is shown in FIG. 7.

The float 1 is linked to valve 64 by an arm 2 which fastens to valve 64 at hole 105. By referring to FIG. 1, the operation of the invention may now be viewed in an overall perspective. When the fluid level in the tank is at its normal level the diaphragm valve 51 responds to fluid pressure in pressure chamber 53 and closes discharge orifice 50. Under these circumstances, fluid is unable to flow into the evacuation chamber of ultimate discharge into the tank. When fluid is removed from the tank, the water level is lowered, thereby lowering float 1 which in turn rotates the valve 64 into a position such that the valve outlet port 74 moves out of communication with the connecting chamber 75, thereby allowing the pressure in the pressure chamber to be relieved and the diaphragm valve opens. As the diaphragm valve opens discharge orifice 50, fluid then begins to flow through the inlet supply tube 12 and the inflow pipe 15 causing fluid to subsequently flow into the evacuation chamber 41 from which it is evacuated through evacuation orifice 48 into the tank. When the water level again reaches the predetermined height at which height fluid valve outlet port 74 communicates with connection channel 75, fluid pressure is transmitted to the upper surface of the diaphragm which closes the discharge orifice 50 preventing further fluid flow into the evacuation chamber or tank.

By reference to FIG. 2 in the drawings, the operation of the invention may be further understood. Fluid enters the system through inlet fluid supply tube to 12, passes into acoustic housing 14 and thereafter enters into the inlet inflow pipe 15. During the fluid passage through inflow pipe 15, internal bore 30 carries the fluid to nozzle 33 with an orifice which is of smaller diameter than that of inlet bore 30. The fluid therefore increases in velocity as it approaches nozzle 33 from which the fluid discharges into bore 34 which is of a larger diameter than the inlet bore 30. Vibrations occurring as a result of velocity changes of the fluid within the system are substantially dampened by the use of acoustic bushing 20 and acoustic upper mount riser 26, thereby reducing vibration transmitted to the fluid tank and substantially eliminating drum noises associated with tank vibration. By use of the nozzle 33 in conjunction with a surrounding void between the nozzle and the wall of inflow pipe 15 water surging is avoided which also contributes to the lowering of the noise level during the operation of the system.

Continuing the trace of fluid flow through the system, fluid enters inlet 61 of the bypass channel 60 and flows into charging port 62. The fluid enters pilot valve 64 at inlet port 68. Fluid passes through the inlet passage 63 and enters the cylindrical bore 69 of pilot valve 64. When the valve outlet port is in communication with connecting channel 75 leading into pressure chamber 53, fluid will enter the pressure chamber increasing the fluid pressure against the diaphragm. The increased pressure against the diaphragm 51 will cause the diaphragm to close against the discharge orifice 50 thereby preventing fluid to discharge into the evacuation chamber 41. Siphoning into evacuation chamber 41 is prevented since the anti-siphon airholes 42, located in the base of the evacuation chamber will equalize atmospheric pressure with the pressure in the evacuation chamber.

When the fluid level in the tank is lowered, the corresponding movement of the float which is transmitted through linkage arm 2 to the pilot valve 64 will cause the pilot valve to rotate. As the rotation progresses, the outlet valve port 74 moves out of alignment with connecting channel 75 to the pressure chamber. The lipseal puck 71 is so positioned that fluid pressure will force the lipseal against the wall of the valve housing sealing off the fluid channel within the rotary valve thereby precluding transmission of fluid pressure or the flow of fluid through the outlet port of the pilot valve. The pressure in pressure chamber 53 is relieved into an area around the periphery of the pilot valve between O-rings 67 and 77 by fluid reaching slots 101 and 102 in the periphery of the pilot valve where said periphery of the valve now communicates with the evacuation chamber through channel 103 and evacuation chamber channel port 104. See FIGS. 6 and 7. In this configuration, diaphragm valve 51 opens and fluid discharges through the discharge orifice 50 into the evacuation chamber 41 and is subsequently evacuated through evacuation orifice 48 into the tank. As the fluid level in the tank rises, float 1 will again move so as to transmit its movement through the linkage arm 2 to the pilot valve 64 until communication between the valve outlet port 74 and connecting channel 75 reoccurs, thereby permitting the fluid pressure to again act upon the diaphragm valve which in response to said pressure closes the discharge orifice and no further fluid is evacuated into the tank.

From the foregoing, those skilled in the art will readily understand the nature of the invention, its construction and operation, and the manner in which it achieves and realizes all of the objects and advantages as set forth in the foregoing as well as its many additional advantages that are apparent from a detailed description.

The foregoing disclosure is presentative of a preferred form of the invention and is to be interpreted in an illustrative rather than a limiting sense, the invention to be accorded the full scope of the claims appended hereto.

We claim:

1. A pilot operated ball cock valve for controlling liquid in a tank, comprising a housing having a pressure chamber and evacuation chamber contained within said housing;

first means contained within said housing for discharging fluid into the evacuation chamber from which fluid flows into the tank;

diaphragm means mounted between the pressure chamber and evacuation chamber of said housing for closure upon said first means to prevent fluid flow into the evacuation chamber;

a pilot valve having a valve member rotatably mounted in said housing having an internal fluid channel for communication with said first means and the pressure chamber upon sufficient rotation of said pilot valve, the valve member being cylindrical and being mounted in a bore in said housing, and sealing means sealing the valve member with respect to the bore;

second means for rotating said pilot valve responsive to the height of fluid in a tank such that communication of said internal fluid channel with the pressure chamber transmits fluid pressure to said diaphragm means thereby closing said first means and preventing fluid discharge into the evacuation chamber.

2. The pilot operated ball cock valve as recited in claim 1 further comprising an acoustic mounting means for reducing tank vibration noise.

3. The pilot operated ball cock valve as recited in claim 1 wherein said internal fluid channel includes a recess having a sealing element in its having a port movable with respect to a port having communication with said pressure chamber.

4. The pilot operated ball cock valve as recited in claim 3 further comprising a relief channel providing communication between said internal fluid channel of said pilot valve and said evacuation chamber.

5. The pilot operated ball cock valve as recited in claim 4 wherein the pilot valve member further is provided with annular groove means in the periphery of said pilot valve member for communicating with said recess and said relief channel.

6. The structure as in claim 1 wherein said first means includes an inlet pipe passing through an opening in the wall of said tank, and means mounting said inlet pipe to the wall of the tank providing a sound deadening characteristic.

7. A structure as in claim 6 wherein said last means includes a bushing formed of flexible material and securement means whereby the inlet pipe is mounted by way of a part of the said flexible bushing means.

8. A construction as in claim 7 including securing means constructed to clamp a part of the said flexible bushing against the wall of the tank, and a further support bushing secured to the flexible bushing and having a part carrying the inlet tube.

9. A valve as in claim 1 wherein the sealing means includes O-rings positioned in annular grooves formed in the valve member.

10. A valve as in claim 3, wherein said sealing element is made of sealing material, the port in it being positioned radially, whereby angular movement of the valve member moves the port in the sealing element into and out of engagement with the said port having communication with the said pressure chamber.

* * * * *